(12) United States Patent
Martin (10) Patent No.: US 7,090,820 B2
(45) Date of Patent: Aug. 15, 2006

(54) POTASSIUM MONOPERSULFATE TRIPLE SALT WITH INCREASED ACTIVE OXYGEN CONTENT AND SUBSTANTIALLY NO $K_2S_2O_8$

(75) Inventor: Perry L. Martin, Yuba City, CA (US)

(73) Assignee: TruOx, Inc., McClellan, CA (US)

( * ) Notice: Subject to any disclaimer, the term of this patent is extended or adjusted under 35 U.S.C. 154(b) by 131 days.

(21) Appl. No.: 10/878,169

(22) Filed: Jun. 28, 2004

(65) Prior Publication Data

US 2005/0062017 A1    Mar. 24, 2005

Related U.S. Application Data

(60) Provisional application No. 60/505,466, filed on Sep. 23, 2003.

(51) Int. Cl.
*C01B 15/08* (2006.01)
*C01B 15/06* (2006.01)

(52) U.S. Cl. ............. 423/513; 252/186.27; 252/186.43

(58) Field of Classification Search ................ 423/513
See application file for complete search history.

(56) References Cited

U.S. PATENT DOCUMENTS

| | | | | |
|---|---|---|---|---|
| 2,802,722 | A * | 8/1957 | Stephanou | 423/513 |
| 2,926,998 | A * | 3/1960 | Stephanon et al. | 423/513 |
| 3,036,885 | A * | 5/1962 | Muller et al. | 423/513 |
| 3,939,072 | A | 2/1976 | LaForte | 210/96 |
| 4,579,725 | A | 4/1986 | Jayawant | 423/513 |
| 4,610,865 | A | 9/1986 | Reh et al. | 423/513 |
| 5,139,763 | A | 8/1992 | Amini | 423/513 |
| 5,141,731 | A | 8/1992 | Meier et al. | 423/521 |
| 5,250,280 | A * | 10/1993 | Bertsch-Frank et al. | 423/513 |
| 5,429,812 | A | 7/1995 | McDonogh et al. | 423/521 |
| 5,607,656 | A | 3/1997 | Soicke et al. | 423/513 |
| 6,221,826 | B1 | 4/2001 | Surutzidis et al. | 510/349 |
| 2005/0031530 | A1 * | 2/2005 | Martin | 423/513 |

OTHER PUBLICATIONS

International Search Report and Written Opinion of the International Searching Authority for International application No. PCT/US04/31625 dated Jan. 18, 2006.

\* cited by examiner

*Primary Examiner*—Joseph D. Anthony
(74) *Attorney, Agent, or Firm*—DLA Piper Rudnick Gray Cary US LLP (57) ABSTRACT

A method of preparing a potassium monopersulfate composition is presented, wherein the potassium monopersulfate composition has the formula $(KHSO_5)_x(KHSO_4)_y(K_2SO_4)_z$, where $x+y+z=1$ and $x=0.46-0.64$, $y=0.15-0.37$, and $z=0.15-0.37$, said potassium monopersulfate composition having an active oxygen content greater than or equal to 4.9 wt. % and $K_2S_2O_8$ at a concentration of <0.5 wt. % of the potassium monopersulfate composition. The method includes reacting an $H_2O_2$ solution containing at least 70 wt. % $H_2O_2$ with a $H_2SO_4$ solution at a substoichiometric ratio of the $H_2SO_4$ to $H_2O_2$ to generate a weak Caro's acid solution, then combining the weak Caro's acid solution with oleum to produce a rich Caro's acid solution. The rich Caro's acid solution may be combined with an alkali potassium compound to produce the potassium monopersulfate composition. During the process, the temperature is maintained at below 30 ° C.

31 Claims, 6 Drawing Sheets

POTASSIUM MONOPERSULFATE TRIPLE SALT WITH INCREASED ACTIVE OXYGEN CONTENT AND SUBSTANTIALLY NO K2S2O8

RELATED APPLICATION

This application claims the benefit of U.S. Provisional Application Ser. No. 60/505,466 filed on Sep. 23, 2003 under 35 U.S.C. § 119(e) and incorporates by reference the content of the provisional application in its entirety.

FIELD OF TECHNOLOGY

The invention pertains generally to production of potassium monopersulfate and particularly to production potassium monopersulfate having low oxodisulfate byproduct.

BACKGROUND

Potassium monopersulfate ($KHSO_5$), also known as potassium peroxymonosulfate, is a component of a triple salt with the formula $2\ KHSO_5$—$KHSO_4$—$K_2SO_4$. Due to the high oxidation potential of potassium monopersulfate ("PMPS"), the PMPS triple salt $2\ KHSO_5$—$KHSO_4$—$K_2SO_4$ makes a good candidate as a component in bleaches, cleansing agents, detergents, and etching agents, and also as an oxidizing agent in inorganic reactions.

While PMPS's strong oxidation potential is well known, PMPS is limited in its utility because of the presence of an irritating byproduct, $K_2S_2O_8$. The severe irritating qualities of $K_2S_2O_8$ and its inherent stability relative to the desirable $KHSO_5$ limit the use of PMPS to products that would not come in contact with its users. Thus, while PMPS could be used in personal care products, manufacturers do not use PMPS for the fear that users of these products will experience irritation from the $K_2S_2O_8$. The irritating effects of $K_2S_2O_8$ even limit the use of PMPS in products that come into contact with users (and their pets) indirectly, such as surface cleaners, laundry bleaching agents, and swimming pool water treatment solutions. Even low levels of $K_2S_2O_8$ accumulated in pool water or laundry as residues can cause undesirable effects on humans and pets that come into contact with it. Ideally, to be able to use PMPS in these products, the level of $K_2S_2O_8$ as a byproduct should be <0.1 wt. % of the PMPS.

One way to reduce or eliminate the fraction of $K_2S_2O_8$ in a PMPS product is to increase the yield and stability of the desirable $KHSO_5$ without using oleum, since the use of oleum results in the production of $K_2S_2O_8$. Since a higher active oxygen content in the end product correlates with a higher fraction of $KHSO_5$, it is desirable to achieve a PMPS composition with increased active oxygen content and higher stability using $H_2SO_4$. Publicly available Caro's acid conversion data (e.g., data from FMC Corporation) indicates that with $H_2SO_4$ to $H_2O_2$ molar ratios of 1:1 and 2:1, the active oxygen obtained from the Caro's acid equilibrium products yields 4.3% and 3.7%, respectively.

Typically, PMPS triple salt is produced by using Caro's acid ($H_2SO_5$, also called peroxymonosulphuric acid). Caro's acid is usually produced by reacting $H_2SO_4$ or oleum with $H_2O_2$. More specifically, Caro's acid is an equilibrium product between these reactants on one hand and $H_2SO_5$ and $H_2O$ on the other, as shown by the following reaction:

$$H_2SO_4 + H_2O_2 <<>> H_2SO_5 \text{ (Caro's acid)} + H_2O.$$

As the molar ratio of $H_2SO_4$ to $H_2O_2$ increases, the yield of $H_2SO_5$ increases. Thus, in order to optimize the amount of Caro's acid that is produced, excess $H_2SO_4$ or oleum is added during the process.

The Caro's acid is reacted with alkali potassium salts such as $KHCO_3$, $K_2CO_3$, and/or $KOH$ to generate $KHSO_5$:

$$H_2SO_5 + KOH \rightarrow KHSO_5 + H_2O.$$

Thus, increasing the yield of Caro's acid results in a higher concentration of $KHSO_5$, which helps reduce formation of the irritant $K_2S_2O_8$. The potassium to sulfur ratio (K/S) is controlled to produce a specific composition. Generally, a K/S of <1.0 will result in a high yield of $KHSO_5$ because K/S>1.0 induces some attrition of the desired salt to produce $K_2SO_4$.

However, the salt resulting from K/S<1.0 is too unstable for most commercial applications and is hygroscopic (absorbs water). To make a stable, nonhygroscopic triple salt, a sufficient level of K/S must be achieved to produce the stabilizing sulfate salts (i.e., $KHSO_4$ and $K_2SO_4$). In producing these compositions, the excess potassium (K/S>1.0) reacts with both $KHSO_5$ and $KHSO_4$, following an attrition close to their molar ratios. The decomposition of monopersulfate reduces the A.O. level in the resulting triple salt and increases sulfates.

Various parameters have been manipulated to optimize Caro's acid production. One of these parameters is reaction temperature. Temperature has been controlled to reduce the decomposition of Caro's acid, which results in release of oxygen and increase in sulfate salts, neither of which is desirable. Some knowledge regarding preparation of Caro's acid and PMPS triple salt are provided in the following references:

U.S. Pat. No. 3,939,072 ("the '072 patent") teaches a process for point of use production of Caro's acid, in which the Caro's acid is cooled to between −10° C. to 80° C. to reduce decomposition of the Caro's acid before its use.

U.S. Pat. No. 5,141,731 ("the '731 patent") teaches a process and an apparatus for point of use generation of peroxyacids by adding $H_2O_2$ to a stream of $H_2SO_4$ in multiple stages. The $H_2SO_4$ is cooled to between 15 to −40° C. before this addition. After the addition, the resulting solution is cooled to a temperature of 0 to 80° C. to reduce the decomposition of Caro's acid. The Caro's acid has to be diluted with water or used immediately thereafter, before decomposition of the Caro's acid happens. As in the '072 patent, the cool temperature is maintained to prevent A.O. loss that is generally caused by a higher temperature that results from the exothermic reaction. The resulting solution is reported to be 15% higher in $H_2SO_5$ when using multiple additions of $H_2O_2$ versus one addition. However, if the dilution with water or the use of the Caro's acid is not immediately done after the $H_2O_2$ addition, the equilibrium reaction takes place and the A.O. level rises to about 4.3. In lab experiments, Caro's acid solution is produced over a period of about 20 seconds, diluted with water to a solution strength of less than 200 g/l to stop the reactions, then chilled to preserve the Caro's acid for analysis. In practical use, the invention requires a series of stages wherein some amount of $H_2O_2$ is added to the oxyacid in each stage, mixed, and cooled.

This method illustrates that a higher percentage of $H_2O_2$ conversion can be achieved by controlling the order of addition of the reagents. However, the resulting Caro's acid solution must be used immediately after production as is the case utilizing the disclosed invention, or rapidly diluted with water in order to preserve the benefits of the invention. If not used or diluted immediately after its production, as disclosed in literature and prior art, the $KHSO_5$ portion of the Caro's acid solution will decompose to achieve the equilibrium product that is well established in the prior art, resulting in a triple salt having an A.O. of $\leq 4.3$.

Another shortcoming of this method is that it is difficult to implement with the use of traditional single-stage reactors. This technique requires multiple series of reactors, each independent of the other, to provide a single pass process. Naturally, this process excludes the use of traditional single-stage reactors such as batch or stirred tank reactors since addition of the $H_2O_2$ requires substantially more time to complete the addition and reaction before application or dilution whereby the reactions, including the equilibrium reaction, are sequestered.

U.S. Pat. No. 5,429,812 ("the '812 patent"), which discloses a process of producing peroxysulfuric acid from substoichiometric levels of $H_2SO_4$ to $H_2O_2$, teaches using a substoichiometric amount of $H_2SO_4$ to produce an equilibrium amount of Caro's acid. The final mixture in the '812 patent has a molar ratio of $SO_3$ to Available Oxygen in the range of 0.8 to 0.2. The '812 patent also teaches that the order in which these reagents are introduced does not affect the Caro's acid yield. The reagents used were 70% $H_2O_2$ and 93% $H_2SO_4$. The '812 patent discloses that regardless of taking steps to avoid decomposition such as cooling and agitation, trials demonstrated that equilibrium occurred very quickly when the reactants were brought into contact, and that the position of the equilibrium depended consistently on the molar concentrations of the reactants, independently of the order of introduction.

As disclosed in the '812 patent, even with adequate cooling and agitation to prevent decomposition, the equilibrium proceeds rapidly and results with an A.O. value consistent with the established equilibrium products. This occurred regardless of the order of reactant addition and was independent of the reactant concentrations, which include $H_2O$ concentration. Also, previously, it was known that using 70% $H_2O_2$ and $H_2SO_4$ will result in a Caro's acid solution with an active oxygen content of no greater than 4.3% at a 1:1 molar ratio.

U.S. Pat. No. 5,139,763 ("the '763 patent") teaches making Caro's acid with a supra-stoichiometric molar amounts of oleum to $H_2O_2$. It discourages using $H_2SO_4$ on the grounds that a higher molar equivalent of $H_2SO_4$ is required to obtain similar yields of $H_2SO_5$ compared to oleum, resulting in a higher manufacturing cost. Also, when this high molar equivalent of $H_2SO_4$ is used, the molar ratio of the resultant solution has a $H_2SO_5$ to $H_2SO_4$ ratio that is less than what is desired for the preparation of the PMPS triple salt. The Caro's acid is partially neutralized to raise the K/S to 1.15–1.25, then combined with a solution richer in monopersulfate.

The method of the '763 patent involves many steps and results in an undesirably high concentration of $K_2S_2O_8$.

U.S. Pat. No. 5,607,656 ("the 656 Patent") describes a process for producing PMPS with high available oxygen and a low concentration of $K_2S_2O_8$. This process involves reacting 20 to 70 wt. % strength oleum with 30 to 70 wt. % strength hydrogen peroxide to form Caro's acid, partially neutralizing the Caro's acid, then adding sulfuric acid and potassium hydroxide to the mixture by injection into the vacuum crystallizer while evaporating off the moisture. The resulting wet salt has a $K_2S_2O_8$ concentration of less than 1.5 wt. %, which is reported to be less than that found in the commercially available triple salt. However, the commercial advantage of this process is limited by the increase in cost associated with all the additional reagents (higher $SO_4$ to $H_2O_2$ molar ratio) required to dilute the $K_2S_2O_8$ concentration in the triple salt, and the resulting A.O. as compared to the initial Caro's acid solution.

The '656 patent discloses a process for producing a triple salt with reduced oxodisulfate by reacting Caro's acid produced from oleum with additional $H_2SO_4$ and KOH. This dilution process utilizes established processing techniques as previously disclosed. Like other disclosures, the critical chemistry and control parameters are met to produce the resulting triple salt.

U.S. Pat. No. 4,579,725 ("the '725 patent") describes a process for producing PMPS with high available oxygen and low $K_2S_2O_8$ by partially neutralizing the Caro's acid produced from 65–75% oleum and $H_2O_2$ by reacting the reagents at a sulfur to peroxide molar ratio of 0.9 to 1.2. The Caro's acid is reacted with KOH to achieve a K/S ratio <0.95. The resulting slurry is concentrated by using vacuum evaporation so that the fraction of the slurry solids is sustained at <40%. The mother liquor that is rich in $KHSO_5$ is recycled back to the evaporator. $MgCO_3$ is aggressively added to the concentrated slurry to control the K/S ratio to yield a product of high A.O. The $MgCO_3$ treatment is needed because the product has low-K/S product has low stability and melting point.

The '725 patent uses 65–75% oleum to produce Caro's acid, performs partial neutralization with KOH solution to achieve K/S ratio <0.95, concentrates using vacuum evaporation to slurry solids of <40%, forms a wet cake while returning concentrate back to the evaporator, adds $MgCO_3$ to the cake, mixes and dries, and adds more $MgCO_3$.

The resulting monopersulfate salt from the low K/S ratio is hygroscopic and unstable. Coating with $MgCO_3$ was shown to stabilize the salt. $MgCO_3$ has been used as an anti-caking agent to improve fluidity of the triple salt for many years.

U.S. Pat. No. 4,610,865 ("the 865 Patent") discloses a process to produce and concentrate a solution containing $KHSO_5$ to a monopersulfate concentration of 20–30 wt. % $KHSO_5$, cooling a partial stream to <15° C. to precipitate the triple salt, filtering the triple salt, and drying.

Like the '725 patent, the '865 patent defines specific chemical and control parameters like those disclosed in the expired prior art patents mentioned above, to produce a composition of triple salt precipitated from a solution of $KHSO_5$ using a cold precipitation technique. The equipment and methods of producing the Caro's acid, triple salt, concentrating and separating are consistent with previously disclosed methods of processing.

The resulting monopersulfate, like that in the '725 patent, is produced from substoichiometric levels (excess sulfuric acid) of potassium to sulfur, and therefore is hygroscopic and exhibits poor shelf life.

All of the disclosed methods of producing a stable, non-hygroscopic (K/S>1.15) triple salt of reduced $K_2S_2O_8$ with high active oxygen (>4.7%) require additional treatment of the slurry streams, reprocessing of solutions of triple salt to dilute the $K_2S_2O_8$, and/or additional treatment steps to increase stability and melting point of the resulting triple salt. In doing so, waste streams of discarded inert salts such as $K_2SO_4$, and/or multiple processing steps, high recycle rates, and elaborate process control scenarios are proposed.

Because of the indirect nature of producing these hybrid triple salts, their commercial viability is severely impaired due to the increased production cost resulting from product waste (discarded salts) and/or extensive recycling and reprocessing of the triple salt solutions.

Thus, the search for a way to efficiently produce PMPS triple salt with less irritant byproducts (e.g., $K_2S_2O_8$) and higher active oxygen with a high stability at a reasonable cost continues.

SUMMARY

The invention is a potassium monopersulfate composition having the formula $(KHSO_5)_x \cdot (KHSO_4)_y \cdot (K_2SO_4)_z$, where $x+y+z=1$, wherein the potassium monopersulfate composition contains an active oxygen content greater than or equal to 4.5 wt. % and $K_2S_2O_8$ at a concentration of <0.5 wt. % of the potassium monopersulfate composition. The K/S ratio of the composition is >1. In one embodiment, the composition is such that $x=0.46–0.64$, $y=0.15–0.37$, and $z=0.15–0.37$. In another embodiment, the composition is such that $x=0.43–0.64$, $y=0.15–0.43$, and $z=0.15–0.43$. The invention also includes a method of producing these potassium monopersulfate compositions.

In one aspect, the method of the invention includes reacting an $H_2O_2$ solution containing at least 70 wt. % $H_2O_2$ with a first sulfur source solution containing a first sulfur source, at a substoichiometric ratio of the first sulfur source to $H_2O_2$, to generate a first Caro's acid solution. The first Caro's acid solution contains $H_2SO_5$ and $H_2O$. The first Caro's acid solution is combined with a second sulfur source solution, which contains a second sulfur source that is different from the first sulfur source. The second sulfur source solution reacts with the $H_2O$ in the first Caro's acid solution to produce a second Caro's acid solution. An alkali potassium compound to the second Caro's acid solution to achieve a partially neutralized solution, forming the potassium monopersulfate composition. Suitable sulfur sources include but are not limited to $H_2SO_4$ and oleum.

In another aspect, the invention is a method of preparing a stable, non-hygroscopic potassium monopersulfate composition by adding an $H_2O_2$ solution to a $H_2SO_4$ solution at a substoichiometric ratio of $H_2SO_4:H_2O_2$ to generate a first Caro's acid solution. The $H_2O_2$ solution contains at least 70 wt. % $H_2O_2$ and the $H_2SO_4$ solution contains at least 90 wt. % $H_2SO_4$. The first Caro's acid solution contains $H_2SO_5$ and $H_2O$. The first Caro's acid solution is combined with oleum, which contains $H_2SO_4$ and $SO_3$. This combination produces a second Caro's acid solution. An alkali potassium compound is added to the second Caro's acid solution to achieve a partially neutralized solution containing a potassium monopersulfate composition of the formula $(KHSO_5)x \cdot (KHSO_4)y \cdot (K_2SO_4)z$, where $x+y+z=1$ and $x=0.46–0.64$, $y=0.15–0.37$, and $z=0.15–0.37$, said potassium monopersulfate composition having an active oxygen content greater than or equal to 4.9 wt. % and $K_2S_2O_8$ at a concentration of <0.5 wt. % of the potassium monopersulfate composition.

In yet another aspect, the method of the invention includes obtaining a Caro's acid solution containing $H_2SO_5$ by adding an $H_2O_2$ solution to an agitated $H_2SO_4$ solution at a supra-stoichiometric molar ratio of $H_2SO_4$ to $H_2O_2$. The Caro's acid solution is diluted to produce a diluted Caro's acid solution that contains no more than 60 wt. % $H_2SO_5$. The diluted Caro's acid solution is partially neutralized with an alkali potassium compound to form a wet product having a K/S ratio >1. The wet product is separated into a mother liquor and a slurry containing the potassium monopersulfate composition. The $H_2O$ in the slurry is then to produce an end product containing the potassium monopersulfate composition.

DETAILED DESCRIPTION OF THE PREFERRED EMBODIMENT(S)

As used herein, a "peroxide solution" and a "sulfuric acid solution" refer to solutions of $H_2O_2$ and water, and $H_2SO_4$ and water, respectively. "Oleum" refers to free $SO_3$ dissolved in $H_2SO_4$. A "Caro's acid solution" refers to Caro's acid ($H_2SO_5$) mixed with one or more of $H_2O_2$, $H_2O$, and $H_2SO_4$. The terms "stabilizing" and "stabilized," when used in reference to the Caro's acid solution, indicate the suppression of the equilibrium reaction, or suppression of Reaction 1b (see below) that converts the $H_2SO_5$ back to the reactants. A "stable" potassium monopersulfate composition, on the other hand, has an active oxygen loss of <1% per month. "Nonhygroscopic" means having a K:S ratio greater than 1.

A "weak" Caro's acid is Caro's acid with sub-stoichiometric molar ratio of $H_2SO_4$ to $H_2O_2$. A "rich" Caro's acid solution is a solution with an $SO_4$ molar ratio of greater than or equal to the $H_2O_2$ based on the reactants basis.

The rate of the reaction between $H_2SO_5$ and $H_2O$ changes with temperature and with the order of reagent addition. Thus, by controlling the temperature and the order in which reagents are introduced to produce Caro's acid, a Caro's acid solution having an $H_2SO_5$ concentration that is substantially higher than that of currently available Caro's acid solutions can be produced. Furthermore, by shifting the reaction rate by manipulating temperature, the Caro's acid with high $H_2SO_5$ concentration can be stabilized. The stabilized Caro's acid solution may be used for various purposes, one of which is the production of the PMPS triple salt. The PMPS triple salt prepared with the high- $H_2SO_5$ Caro's acid solution has an A.O. level that is substantially higher than that of conventional PMPS triple salts.

Controlling the temperature in Caro's acid equilibrium reaction affects the rate of reaction. If the reactants are added in the right order under the right temperature to favor the formation of $H_2SO_5$, and if the resulting product is stabilized until all the reactants are added and the reaction is complete, Caro's acid production is optimized for high $H_2SO_5$ concentration. A Caro's acid solution having a higher molar ratio of $KHSO_5/H_2SO_4$ can be used to prepare a stable, non-hygroscopic PMPS triple salt composition that has an active oxygen greater than the reported maximum of 4.3% (e.g., the '731 patent). To prepare a useful version of the high-A.O. PMPS triple salt, the increased concentration of $KHSO_5$ has to be stabilized so that $KHSO_5$ does not decompose.

As stated above, Caro's acid is an equilibrium product of the following two equilibrium reactions:

(Reaction 1a)

(Reaction 1b)

Reaction 1a is herein referred to as the "forward reaction," and Reaction 1b is herein referred to as the "reverse reaction." $H_2SO_4+H_2O_2$ are herein referred to as the "reactants." As the water content increases, the rate of forward reaction decreases. Also, as the concentrations of the reactants become reduced due to the forward reaction, the rate of the forward reaction decreases.

Initially, when $H_2O_2$ is added to a solution of $H_2SO_4$, the molar ratio of $H_2SO_4$ is many times higher than the $H_2O_2$ and the rate of conversion in the forward reaction is high. When the temperature is kept to below or at 20° C., the rate of the reverse reaction (Reaction 1b) is suppressed, maintaining a high concentration of $H_2SO_5$. However, as the addition of $H_2O_2$ continues, the molar ratios of $H_2O_2$ and $H_2SO_4$ become closer to 1.0, the concentration of $H_2O$ increases, and the rate of the forward reaction is reduced. Thus, while the initial rate of reactants' conversion to $H_2SO_5$ is higher than that achieved if $H_2SO_4$ were to be added to $H_2O_2$ or if both reactants were combined at once, the benefits of controlling the order of addition are lost with time due to the effects of the reverse reaction (this was illustrated in the '812 patent). The reverse reaction ultimately lowers the active oxygen level in the PMPS triple salt that is produced with the resulting Caro's acid solution. Thus, measures are needed to stabilize the high- $H_2SO_5$ solution and suppress the reverse reaction.

The '072 patent and the '731 patent teach using or diluting the Caro's acid solution immediately, before the effect of the reverse reaction becomes significant. However, because the reverse reaction quickly begins to take place, it is difficult to complete the dilution process before the reverse reaction takes place, at least with the typical batch and stirred tank reactors. Whereas maintaining the temperature at or below 80° C. is sufficient to reduce the decomposition of the Caro's acid before its application in point-of-use applications, this temperature control method is impractical when the reactant addition and dilution are done in a single stage. For example, a batch reactor, a stirred tank reactor, or a thin-film reactor, which are frequently used for single-stage reactions, require considerable time for reactant additions and completion of the reactions that the reverse reaction would have already been triggered by the time the reagent addition is complete. Without means of stabilizing the $H_2SO_5$ portion of the Caro's acid, the equilibrium is rapidly achieved (as disclosed in '812). The equilibrium occurs despite the efforts of cooling the temperature adequately to reduce the decomposition of $H_2SO_5$.

Oleum, which is rich in $SO_3$, may be added to the $H_2O_2$ to convert water present in the peroxide solution since reducing the water concentration helps drive the forward reaction. Oleum also consumes some of the water that is released from the peroxide during the forward reaction. The reaction of oleum and water proceeds as follows:

(Reaction 2)

As the molar ratio of oleum to $H_2O_2$ approaches 1.0, the ratio of free $H_2O$ to $SO_3$ is significantly reduced, and $SO_3$ begins reacting directly with $H_2O_2$ as illustrated by the following formula:

(Reaction 3)

The production of $H_2S_2O_8$ is undesirable, as it may ultimately result in the formation of the irritant $K_2S_2O_8$.

In order to achieve high active oxygen, sufficient oleum is added to convert as much of the $H_2O_2$ as is economically permitted. As discussed in many of the prior art patents, the molar ratio of sulfur from oleum to peroxide is generally 1.1 to 1.6, with 1.18 being frequently recited.

As illustrated in the '725 patent, in order to prevent or eliminate $K_2S_2O_8$, elaborate process control to balance the slurry chemistry between recycled mother liquor and neutralized Caro's acid solutions are required. Also, other methods are proposed involving reprocessing triple salt solution by treatment with alkali potassium salts to precipitate and remove unwanted $K_2SO_4$, thereby enriching the $KHSO_5$ content, or adding additional $H_2SO_4$ with KOH to the triple salt solution as in the '656 patent, thereby diluting the $K_2S_2O_8$.

In order to produce a stable, non-hygroscopic triple salt composition high in A.O. with substantially no $K_2S_2O_8$, several criteria must be met. First, it is desirable to stabilize $H_2SO_5$ immediately after its formation, to prevent reversion back to the reactants $H_2SO_4$ and $H_2O_2$ according to the reverse reaction of Reaction 1b. Second, residual (free) $H_2O$ must be minimized to maximize the yield in $H_2SO_5$. This can be accomplished by using reactants in the highest range of activity as possible.

Where oleum is used in any of the reaction steps, the feed-rate of oleum, and molar ratio of oleum to $H_2O_2$ must be controlled within specific guidelines to prevent formation of $H_2S_2O_8$ by the reaction of Equation 3 above.

The invention includes novel methods of producing a highly stable, nonhygroscopic potassium monopersulfate composition with high active oxygen and substantially no detectable $K_2S_2O_8$. Thus far, the prevalent belief was that the order of reactant introduction does not affect the reaction outcome when potassium monopersulfate is made with a supra-stoichiometric to stoichiometric molar ratio of $H_2SO_4$ to $H_2O_2$. Once a method of stabilizing the $H_2SO_5$ has been developed, various unique methods of processing Caro's acid and its resulting triple salt can be used to produce compositions of high available oxygen with substantially reduced $K_2S_2O_8$.

Figure 3:
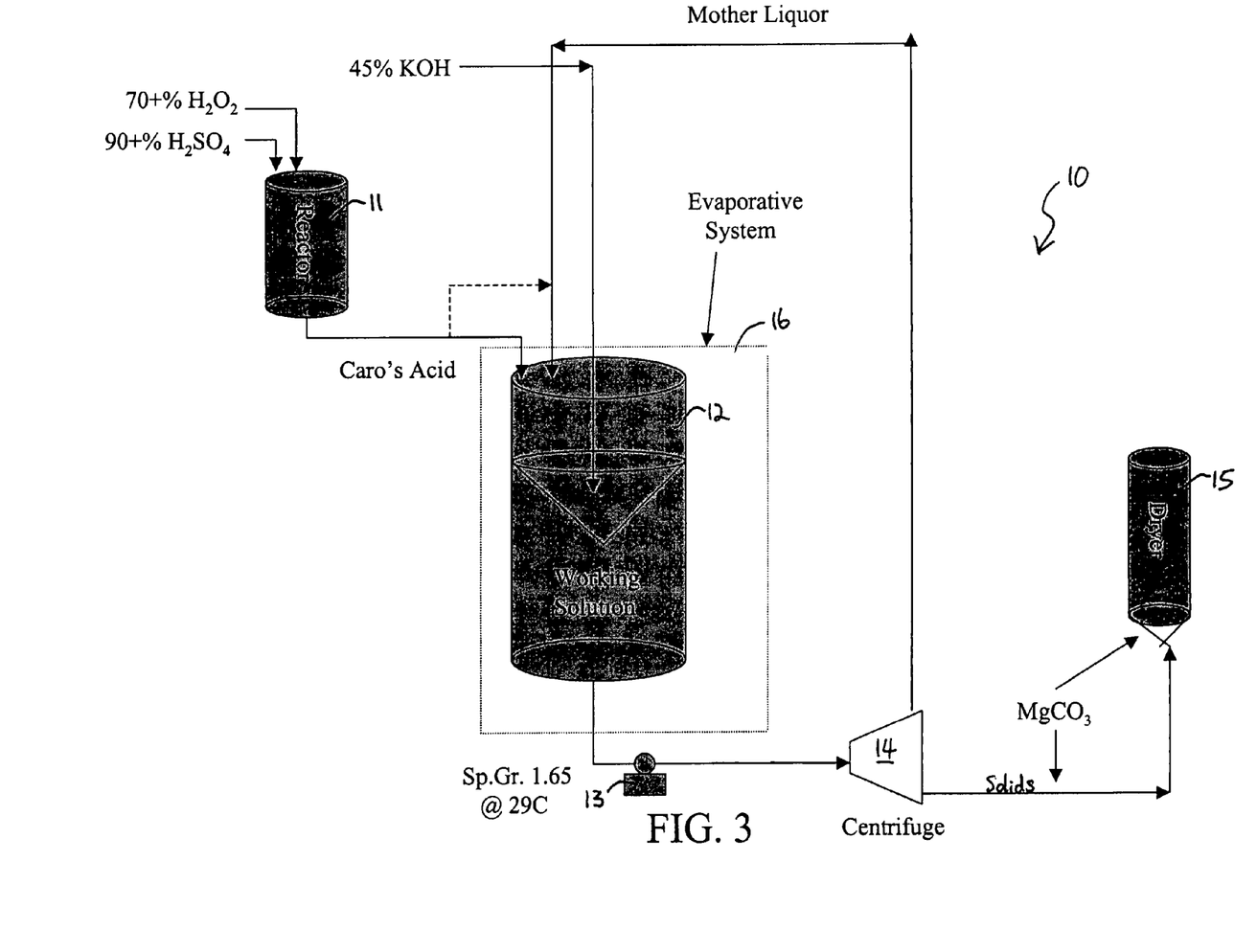
FIG. 3 is an example illustrating a continuous process to produce the composition of the invention.

FIG. 3 is a continuous single-pass process that may be used to implement the invention. The single-pass process system 10 includes a reactor 11 where the sulfur source solution (e.g, $H_2SO_4$ solution, oleum solution) and the peroxide solution are reacted to generate Caro's acid. In addition, the system 10 includes a working tank 12, a slurry pump 13, a centrifuge 14, and a dryer 15. The Caro's acid generated in the reactor 11 is combined with an alkali potassium salt in the working tank 12 to generate the PMPS triple salt, which is in the form of a slurry. The slurry containing the triple salt is pumped by the slurry pump 13 into the centrifuge 14, which separates the slurry into solids and mother liquor. The slurry contains at least 30 wt. % solids, as determined by the specific gravity of the slurry being greater than 1.55 at 29° C., and preferably being 1.65 at 29° C. The mother liquor is recycled back into the working tank 12. The mixture of the recycled mother liquor, the Caro's acid, the alkali potassium salt, and the slurry in the working tank 12 is herein referred to as the "working solution." The working solution is concentrated by being mixed in a vacuum evaporator 16 at a temperature less than or equal to 35° C.

As shown, the solids coming out of the centrifuge 14 are placed in the dryer 15. The solids are dried, preferably at a temperature below 90° C. and more preferably at a temperature below 70° C., to produce the potassium monopersulfate triple salt.

Figure 4:
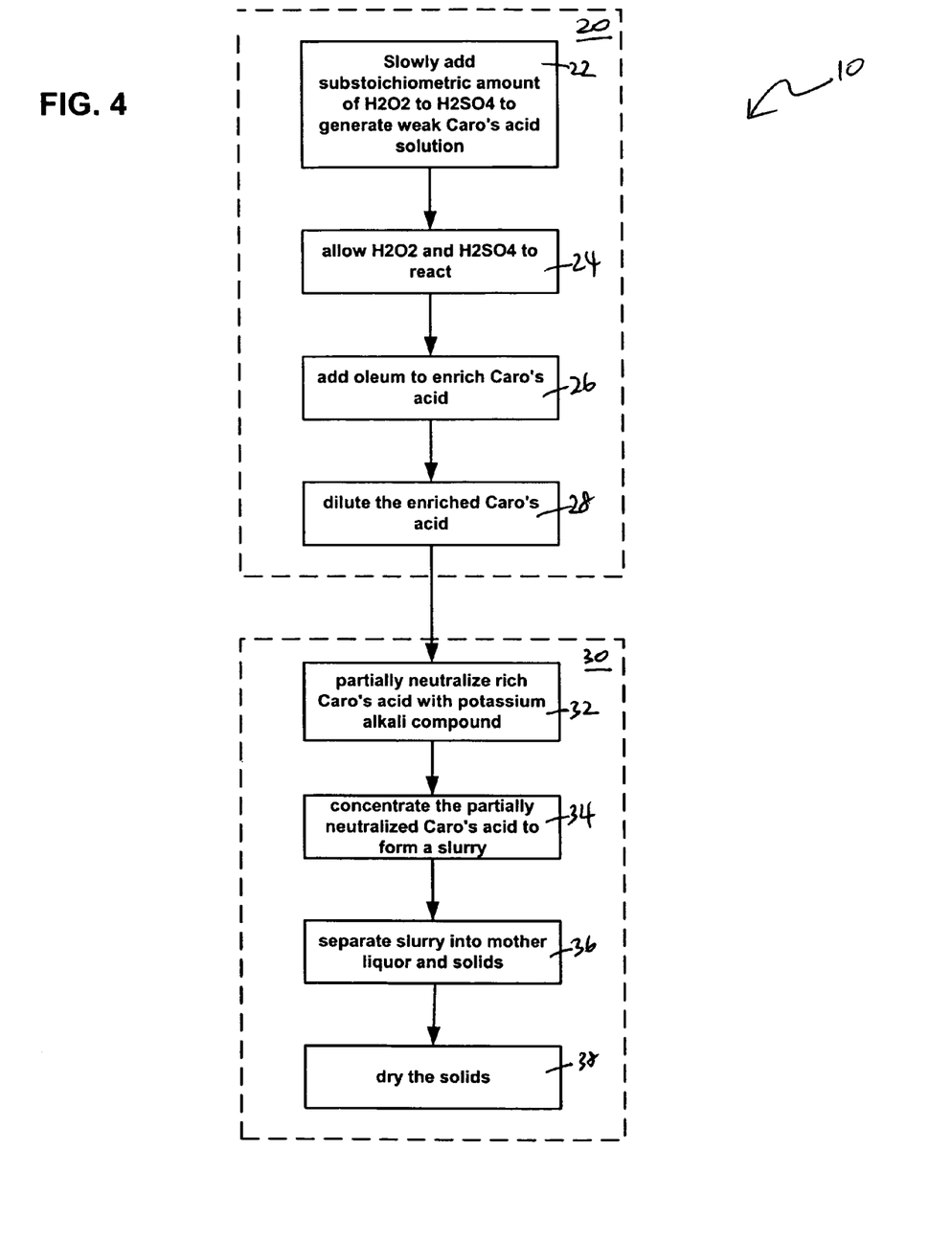
FIG. 4 is a flowchart illustrating a first embodiment of a method for producing PMPS triple salt with low $K_2S_2O_8$ and high A.O., in accordance with the invention.
Figure 5:
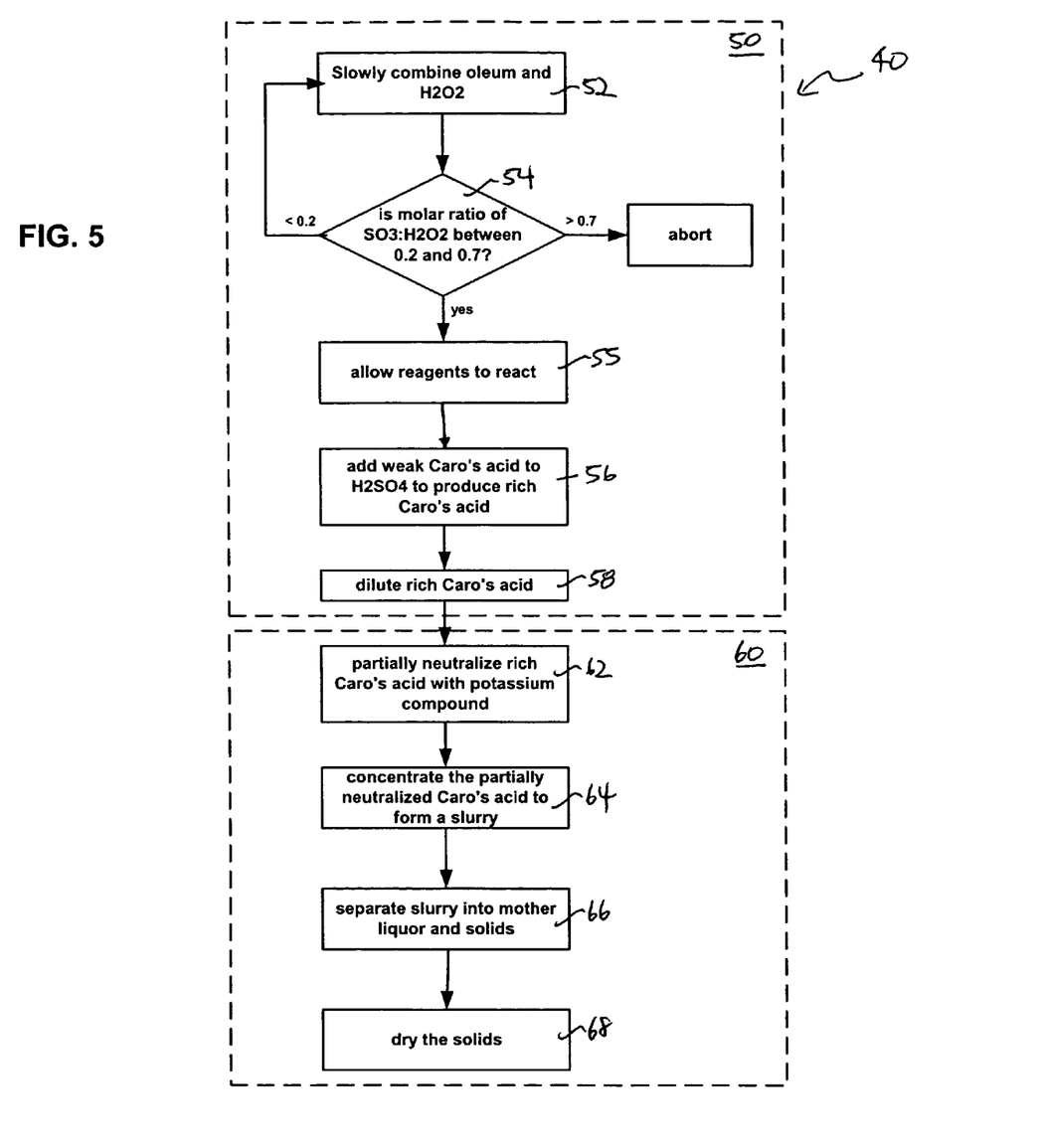
FIG. 5 is a flowchart illustrating a second embodiment of a method for producing PMPS triple salt with low $K_2S_2O_8$ and high A.O., in accordance with the invention.
Figure 6:
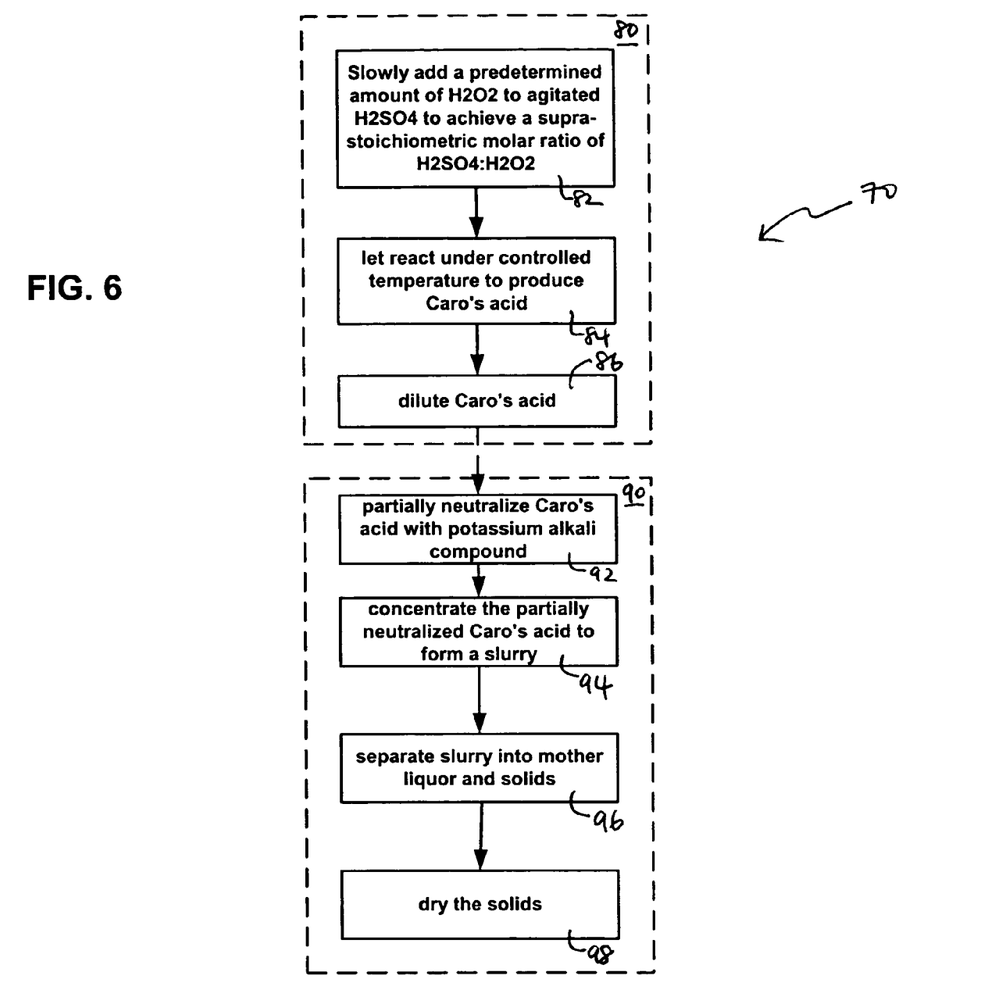
FIG. 6 is a flowchart illustrating a third embodiment of a method for producing PMPS triple salt with low $K_2S_2O_8$ and high A.O., in accordance with the invention.

Three embodiments of the invention are presented herein, and the methods of producing a rich Caro's acid are different in the three embodiments. The first embodiment, which is illustrated in FIG. 4, includes addition of $H_2O_2$ to $H_2SO_4$ at a substoichiometric ratio of $H_2SO_4:H_2O_2$ followed by addition of oleum. The second embodiment, which is illustrated in FIG. 5, includes reaction between oleum and $H_2O_2$ at a $SO_3:H_2O_2$ ratio in the range of about 0.2~0.7, followed by addition of the resultant Caro's acid to $H_2SO_4$. The third embodiment, which is illustrated in FIG. 6, includes addition of $H_2O_2$ to $H_2SO_4$ at supra-stoichiometric ratio of $H_2SO_4:H_2O_2$. The rich Caro's acid solution is diluted with water while controlling the resulting mixture's temperature at <18° C., preferably <10° C. The resulting mixture is then partially neutralized with a solution of alkali potassium salt to raise the K/S ratio of between 1.10 to 1.25. The optimum K/S ratio is dependent on which method is used to produce the Caro's acid.

Embodiment 1

The Caro's acid composition resulting from controlling the order of reactant addition (i.e., $H_2O_2$ to $H_2SO_4$) and thereby obtaining a supra-stoichiometric to stoichiometric ratio of $H_2SO_4$ to $H_2O_2$, results in a higher active oxygen content from $H_2SO_5$. The resulting Caro's acid solution can be stabilized to maintain a high $H_2SO_5$ concentration. By reducing the reverse reaction between $H_2SO_5$ and $H_2O$, a Caro's acid solution is produced which, upon partial neutralization with an alkali potassium, produces a PMPS triple salt having a K/S ratio of between 1.15 to 1.25. Such PMPS triple salt has an active oxygen higher than that of PMPS triple salt made with conventional methods, and does not suffer from the drawbacks of $K_2S_2O_8$ formation.

Upon slow continuous or incremental addition of $H_2O_2$ and/or Caro's acid solution to $H_2SO_4$ under a temperature at or below 20° C., the rate of the forward reaction is initially high due to the excess $H_2SO_4$ and low $H_2O$ concentration. With continued addition of $H_2O_2$, the $H_2SO_5$ converts back to $H_2SO_4$. However, the controlled temperature suppresses the rate of conversion of $H_2SO_5$ even as the $H_2O$ concentration increases. The reversion rate is sufficiently reduced to allow for the benefits provided by the order of reactant addition to be utilized in the production of a triple salt composition. The resulting triple salt is substantially higher in A.O. than the conventional triple salt.

FIG. 4 is a flowchart of a first stabilized triple salt production process 10 in accordance with the invention. The first stabilized triple salt production process 10 includes a first Caro's acid production process 20 and a conversion and separation process 30. In the first Caro's acid production process 20, an $H_2O_2$ solution is slowly (e.g., incrementally) added to an $H_2SO_4$ solution, maintaining a substoichiometric ratio of $H_2SO_4:H_2O_2$ (step 22). Preferably, the $H_2O_2$ solution has a $H_2O_2$ concentration >70%. This slow addition increases the conversion of $H_2O_2$ to $H_2SO_5$ and increases the release of bound $H_2O$ from the $H_2O_2$. As a result, there is more free $H_2O$ in the solution. The resulting weak Caro's acid still contains residual $H_2O_2$ and free $H_2O$, which lead to a higher active oxygen content. The amount of residual $H_2O_2$ is minimized by stopping its addition as soon as the stoichiometric molar ratio of $H_2SO_4:H_2O_2$ is reached or exceeded. The $H_2O_2$ and the $H_2SO_4$ are allowed to react for at least 0.1 hours (step 24).

Then, oleum is added (step 26) to the weak (i.e., substoichiometric molar ratio of total $H_2SO_4$ to $H_2O_2$) Caro's acid solution, which still contains residual $H_2O_2$ and free $H_2O$, to raise the molar ratio of $SO_4$ to $H_2O_2$ to at least the stoichiometric level. Upon the addition of oleum, the free $H_2O$ reacts with $SO_3$, per Reaction 2. By minimizing residual $H_2O_2$, formation of $H_2S_2O_8$ per Reaction 3 is minimized. After step 26, a rich Caro's acid is produced. The rich Caro's acid is optionally diluted (step 28). Temperature is maintained at a level <20° C. throughout the process 20 to stabilize the $H_2SO_5$.

The rich Caro's acid is subjected to the process 30 to form a PMPS triple salt with high A.O. and a substantially reduced amount of $K_2S_2O_8$ compared to the conventional triple salts. The diluted Caro's acid solution is partially neutralized with an alkali potassium compound (step 32) to achieve a K/S ratio greater than 1, preferably between 1.10 to 1.25. The partially neutralized solution is concentrated to form a slurry (step 34), for example by mixing in a vacuum evaporator. The slurry is then separated into mother liquor and solids (step 36), wherein the solids contain the desired PMPS composition. The solids are dried (step 38), preferably at a temperature <90° C. and more preferably at a temperature <70° C., to obtain a PMPS composition that does not have much $H_2O$. The resulting PMPS composition has an active oxygen content higher than 4.3 and has substantially no irritant ($K_2S_2O_8$).

1. First Example of Embodiment 1

28.54 g of 70% $H_2O_2$ (approx. 0.59 mol $H_2O_2$) was added drop-wise to 60.02 g of vigorously agitated 93% $H_2SO_4$ (approx. 0.57 mol $H_2SO_4$) while controlling the temperature with an ice/brine solution between 5–8° C. The addition took 2.5 hrs and produced a Caro's acid solution from almost a 1:1 molar ratio of $H_2SO_4$ to $H_2O_2$.

The Caro's acid solution was allowed to react with vigorous agitation for 60 minutes while the temperature was controlled between 2–5° C.

The Caro's acid solution was diluted with 47.5 g deionized $H_2O$ by addition of the Caro's acid to the water with vigorous agitation while controlling the temperature between 10–15° C. 48.78 g $K_2CO_3$ was diluted with 66.98 g deionized $H_2O$. This solution was added drop-wise to the vortex of the vigorously agitated solution of diluted caro's acid to raise the K/S ratio to 1.2. Temperature was varied between 11–17° C. Total lapsed time to complete the addition was 18 minutes.

The solution was transferred to a glass evaporation tray and placed on a hot plate. A fan was used to increase air circulation and reduce the pressure above the solution. The temperature was controlled between 28–30° C. while continuous mixing was applied.

After 1.75 hrs, the solution was concentrated to a thick paste. The paste was spread across the tray and the temperature was increased to induce drying. The triple salt was periodically mixed and crushed to increase the efficiency of drying. The resulting triple salt had an A.O. content of 4.82% and 0.0% $K_2S_2O_8$.

This Example illustrates that a triple salt composition having an increase in A.O. of 12% greater than that expected from the anticipated equilibrium products from a 1:1 molar ratio of 96% $H_2SO_4$ to 70% $H_2O_2$ by use of the invention. Also, it has been demonstrated that by utilizing the disclosed invention, 80% of the increased $H_2SO_5$ proposed in '731 is stabilized and recovered in the form of $KHSO_5$. These results clearly demonstrate that the rate of the equilibrium reaction can be suppressed to benefit from the supra-stoichiometric ratio induced by the order of reactant addition for the formation of a triple salt composition.

2. Second Example of Embodiment 1

20.54 g of 76% $H_2O_2$ (approx. 0.46 mol $H_2O_2$) was slowly added to 10.02 g 98% $H_2SO_4$ (approx. 0.1 mol $H_2SO_4$).

46.67 g of 26% oleum was slowly added through a drip tube to the weak Caro's acid over a period of 1.5 hours.

The temperature was maintained at between −2 to 8° C. during both steps of the Caro's acid production.

The rich The rich Caro's acid solution was added to 47.23 g deionized $H_2O$ while controlling the temperature between 0–6° C.

48.89 g $K_2CO_3$ was diluted with 59.95 g of deionized $H_2O$ and slowly added to the vortex of the rich Caro's acid, K/S 1.18.

The solution was concentrated using evaporation techniques described in the previous examples to a thick paste. 1.02 g magnesium carbonate hydroxide pentahydrate was added, then the solids were dried.

The resulting triple salt was 6.3% A.O. and 0.0% $K_2S_2O_8$.

This Example illustrates that $H_2O$ bound in the $H_2O_2$ can be effectively released by utilizing the steps of the invention, then reacted with $SO_3$ in the oleum to produce a triple salt free of $K_2S_2O_8$.

3. Third Example of Embodiment 1

Add a supra-stoichiometric ratio of 70–99.6% $H_2O_2$ to agitated 90–100% $H_2SO_4$ while controlling the temperature at ≦20° C., and preferably ≦15° C., and more preferably ≦10° C. The resulting weak Caro's acid solution is converted to a rich Caro's acid solution by slowly or incrementally adding to a solution of 1–75% oleum while controlling the temperature at ≦20° C., preferably ≦15° C., and more preferably ≦10° C. to produce a rich Caro's acid solution.

Figure 1:
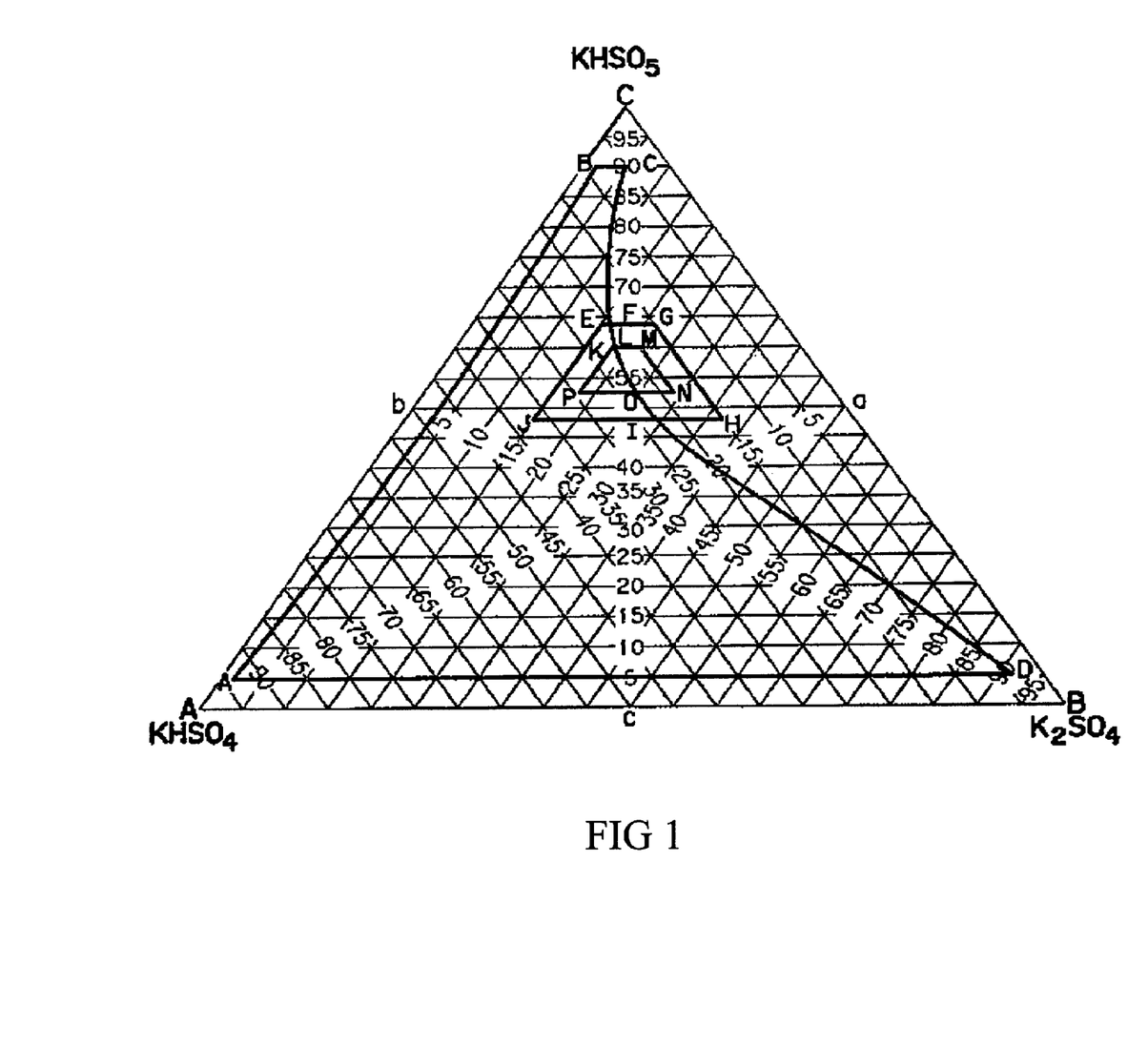
FIG. 1 is a ternary diagram illustrating the compositions of triple salts produced according to currently known methods disclosed in the '763 patent (area enclosed by EGHJE and LMNOL).
Figure 2:
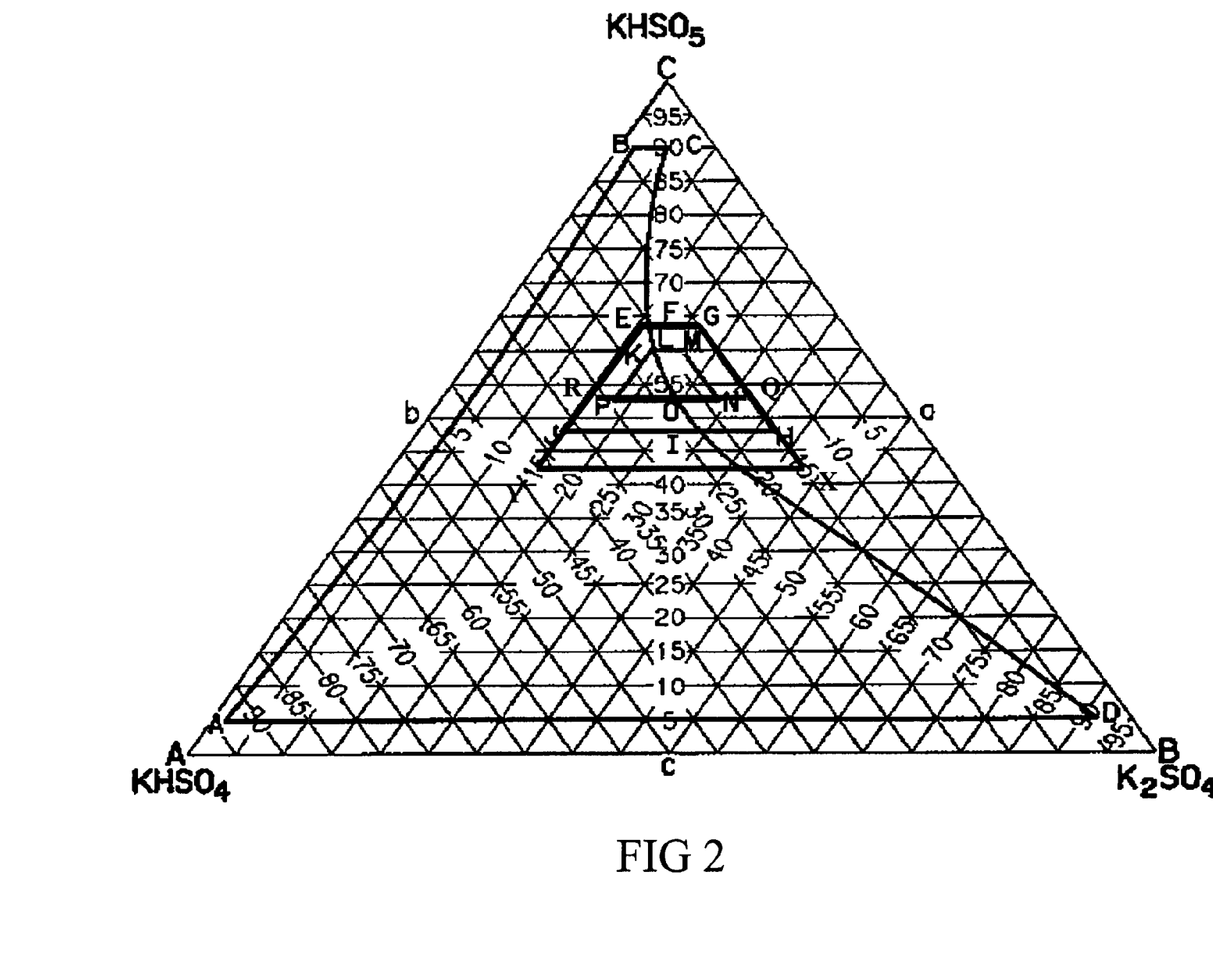
FIG. 2 is a ternary diagram illustrating the compositions of triple salts (EGXYE and EGQRE) produced in accordance with different embodiments of the invention.

The partially neutralized triple salt resulting from the use of the resulting Caro's acid is further processed to produce a nonhygroscopic triple salt defined by the enclosed curve EGXYE, and more specifically EGHJE in FIG. 2 with <0.1 wt % $K_2S_2O_8$, and having the general formula: $(KHSO_5)x \cdot (KHSO_4)y \cdot (K_2SO_4)z$, where x+y+z=1 and x=0.53–0.64, y=0.15–0.33, and z=0.15–0.33.

Embodiment 2

FIG. 5 is a flowchart of a second stabilized triple salt production process 40 in accordance with the invention. The second stabilized triple salt production process 40 includes a second Caro's acid production process 50 and a conversion and separation process 60. In the second Caro's acid production process 40, oleum is combined with $H_2O_2$ at a substoichiometric molar ratio of oleum:$H_2O_2$ (step 52). In contrast to Embodiment 1, the order of reagent introduction is not as important in Embodiment 2, and either reagent may be added to the other. The addition of the reagent stops when the molar ratio of $SO_3$ to $H_2O_2$ is between about 0.2 and about 0.7 (step 54). If this molar ratio range is accidentally passed, it is preferable to start the process over again. By maintaining the $SO_3$:$H_2O_2$ molar ratio within the range of about 0.2~0.7, inclusive, the concentration of $H_2S_2O_8$ is maintained at a low level. Once all the reagents are combined, let the reagents react for at least 0.1 hour (step 55) under a temperature at or below 20° C.

The free $H_2O$ is partially consumed by the $SO_3$, per Reaction 2. The resulting weak Caro's acid, which contains residual $H_2O_2$, is slowly added to the $H_2SO_4$ to further benefit from the higher conversion offered by controlling the order of addition of reagents (step 56). By using substoichiometric ratios of oleum:$H_2O_2$ to consume $H_2O$, and then applying the resulting Caro's acid solution to $H_2SO_4$, a rich Caro's acid solution is produced. The partially neutralized Caro's acid solution is diluted, if needed (step 58).

The diluted Caro's acid solution is subjected to the PMPS composition formation process 60. The diluted Caro's acid solution is first partially neutralized by addition of a potassium alkali compound (step 62) to achieve a K/S ratio greater than 1. The partially neutralized solution is concentrated to form a slurry (step 64), for example by mixing in a vacuum evaporator. The slurry is then separated into mother liquor and solids (step 66), wherein the solids contain the desired PMPS composition. The solids are dried (step 68), preferably at a temperature <90° C. and more preferably at a temperature <70° C., to obtain a PMPS composition that does not have much $H_2O$. The resulting PMPS composition has an active oxygen content higher than 4.3 and has substantially no irritant ($K_2S_2O_8$).

1. First Example of Embodiment 2

50.14 g of 20% oleum was slowly added through a drip tube to 22.35 g of 76% $H_2O_2$ over a period of 2.5 hours with vigorous mixing. The weak Caro's acid was allowed to react for 30 minutes. The weak Caro's acid solution was then slowly added to 10.06 g of 98% $H_2SO_4$ while controlling the temperature between 0–8° C. The rich Caro's acid solution was allowed to react for 45 minutes.

The rich Caro's acid solution was added to 47.81 g of deionized $H_2O$ while controlling the temperature to between 6–9° C. 50.37 g of $K_2CO_3$ was dissolved in 61.75 g of deionized $H_2O$ and slowly added drop-wise to the vortex of the diluted Caro's acid while controlling the temperature between 15–20° C., K/S 1.15.

The solution was evaporated using the techniques described in the previous examples to produce a thick past. The sample (approximately 90 g) was treated with 1 g of magnesium carbonate hydroxide pentahydrate and dried. The resulting treated triple salt had an A.O. of 6.46% and 0.0% $K_2S_2O_8$.

This Example illustrates that a commercially available 20% oleum can be reacted substoichiometric with peroxide to produce a weak Caro's acid substantially free of $H_2S_2O_8$. The weak Caro's acid is then reacted with $H_2SO_4$ inducing a supra-stoichiometric ratio of $SO_4$ to $H_2O_2$, resulting in a rich Caro's acid solution, which is then processed to produce a triple salt having high A.O. and no measurable $K_2S_2O_8$.

2. Second Example of Embodiment 2

A substoichiometric ratio of 1–75% oleum is added to an agitated solution of 70–90% $H_2O_2$ while controlling the temperature at ≦25° C., preferably at ≦15° C., and more preferably at ≦10° C. The resulting weak Caro's acid solution is slowly or incrementally added to a solution of agitated $H_2SO_4$ while controlling the temperature at ≦20°

C., preferably ≦15° C., and more preferably ≦10° C. to produce a rich Caro's acid solution.

The partially neutralized triple salt resulting from the use of Caro's acid produced according to Embodiment 2 is further processed to produce a nonhygroscopic triple salt-defined by the enclosed curve EGXYE, and more specifically EGHJE in FIG. 2 with <0.1 wt % $K_2S_2O_8$, and having the general formula: $(KHSO_5)_x.(KHSO_4)_y.(K_2SO_4)_z$, where x+y+z=1 and x=0.53–0.64, y=0.15–0.33, and z=0.15–0.33.

Embodiment 3

FIG. 6 is a third triple salt production process 70, which includes a third Caro's acid production process 80 and a conversion and separation process 80. Slowly (continuously or incrementally) add $H_2O_2$ to an agitated $H_2SO_4$ solution to induce a supra-stoichiometric molar ratio of $H_2SO_4$ to $H_2O_2$ (step 82). As more $H_2O_2$ is added, the molar ratio of $H_2SO_4/H_2O_2$ decreases. Stop adding $H_2O_2$ when the final ratio is stoichiometric or substoichiometric. Then, let the reagents react for at least 0.1 hour (step 84) to form Caro's acid before diluting the Caro's acid (step 86). The dilution may be with water or a mother liquor recycled from the process 90.

The diluted Caro's acid is partially neutralized with a potassium alkali compound (step 92) to achieve a K/S ratio greater than 1, preferably between 1.10 to 1.25. The partially neutralized solution is concentrated to form a slurry (step 94), for example by mixing in a vacuum evaporator. The slurry is then separated into mother liquor and solids (step 96), wherein the solids contain the desired PMPS composition. The solids are dried (step 98), preferably at a temperature <90° C. and more preferably at a temperature <70° C., to obtain a PMPS composition that does not have much $H_2O$. The resulting PMPS composition has an active oxygen content higher than 4.3 and has substantially no irritant ($K_2S_2O_8$).

1. First Example of Embodiment 3

22.03 g of 76% $H_2O_2$ (approx. 0.49 mol of $H_2O_2$) was added drop-wise to 60.02 g of vigorously agitated 98% $H_2SO_4$ solution (approx. 0.6 mol of $H_2SO_4$) while controlling the temperature with an ice/brine solution between 5–13° C. The addition took 0.5 hrs.

The Caro's acid solution was allowed to react with vigorous agitation for 1.25 hrs while the temperature was controlled between 2–5° C. in an ice/brine solution.

The Caro's acid solution was diluted with 47.17 g deionized $H_2O$ by addition of the Caro's acid to the water with vigorous agitation while controlling the temperature between 10–12C.

47.78 g $K_2CO_3$ was diluted with 66.16 g of deionized $H_2O$. This solution was added drop-wise to the vigorously agitated solution of diluted Caro's acid to raise the K/S ratio to 1.20. The temperature was varied between 10–15° C. The resulting solution was separated into Sample 1 and Sample 2.

Sample 1 was transferred to a glass evaporation tray and placed on a hot plate. A fan was used to increase air circulation and reduce the pressure above the solution. The temperature was controlled between 28–30° C. while continuous mixing was applied. The solution was concentrated to a thick paste. The paste was spread across the tray and the temperature was increased to induce drying. The triple salt was periodically mixed and crushed to increase the efficiency of drying. The resulting triple salt had an A.O. content of 5.35% and 0.0% $K_2S_2O_8$.

This Example illustrates that utilizing point of use concentration of hydrogen peroxide to raise the peroxide to >70%, approximately a 1:1 molar ratio as in example 1 that employs the methods of the disclosed invention results in a triple salt having substantially increased A.O. without any detectable levels of $K_2S_2O_8$.

2. Second Example of Embodiment 3

Sample 2 was concentrated using the evaporation techniques used in Sample 1 until a heavy precipitate formed. The specific gravity was determined to be 1.87, which correlated to a slurry solids content of 65 wt. %. The resulting slurry was filtered and dried. The resulting triple salt had an A.O. of 5.38 and 0.0% of $K_2S_2O_8$.

This Example illustrates that a slurry concentrated to a desired specific gravity, separated and dried, can be effectively used to produce a product of higher A.O. without $K_2S_2O_8$.

3. Third Example of Embodiment 3

The $H_2O_2$ solution has an active content of 70–99.6 wt. % and the $H_2SO_4$ solution has an active content of 90–100 wt. %. During the addition of the $H_2O_2$ solution, the solution is maintained at a temperature <20° C., and preferably <15° C., and more preferably <10° C. The Caro's acid solution is mixed for about 0.01–1 hours thereafter before dilution. These process steps can take place under vacuum, or at or above atmospheric pressure.

The partially neutralized triple salt resulting from the use of Caro's acid thus produced is further processed to produce a nonhygroscopic triple salt defined by the enclosed curve JHXYJ in FIG. 2 with <0.1 wt. % $K_2S_2O_8$, and having the general formula: $(KHSO_5)x.(KHSO_4)y.(K_2SO_4)z$, where x+y+z=1 and x=0.43–0.64, y=0.15–0.43, and z=0.15–0.43.

Because of increased environmental restrictions and the limited availability of enriched oleum (i.e. >30%), hydrogen peroxide was concentrated to >70% using point of use vacuum evaporation of commercially available 50 or 70% technical grade hydrogen peroxide. This process is readily transferable for commercial production of the triple salts of the invention. By utilizing point of use concentrating of commercially available peroxide, transportation, handling and storage, and the high cost of >70% peroxide is all but eliminated. This practice allows for greater flexibility in preparation of the various composition, as well as use of oleum products of ≦30% for most compositions resulting from the disclosed invention.

Of greatest significance and benefit of using the methods of the disclosed invention is the direct front-end production of a Caro's acid solution substantially free of $H_2S_2O_8$ for the production of a triple salt composition high in A.O. and substantially reduced $K_2S_2O_8$.

By producing a Caro's acid solution that is substantially free of $H_2S_2O_8$, the tail-end reprocessing of the triple salt as disclosed in the prior art is no longer needed. Reprocessing of the triple salt slurry and/or discarding removed inert salts of the triple salt required to either dilute the $K_2S_2O_8$ and/or enrich the $KHSO_5$ concentrations of the final triple salt composition. Also, this inventions allows for the direct production of a non-hygroscopic triple salt that has a K/S ratio of greater than 1.10, resulting in a stable triple-salt with a melting point of greater than 90° C. without the need for further treatment to improve melting point or product stability.

The increased A.O. with no $H_2S_2O_8$ can be efficiently produced in the earliest stages of production in a direct once-thru manner. The resulting neutralized Caro's acid solution provided from this invention can be directly processed to produce a triple salt product of high A.O. and substantially reduced $K_2S_2O_8$, thereby reducing waste of discarded salts, reducing equipment size to handle large recycles, energy from high recycle rates, and performing laborious chemical control checks and adjustments.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention.

What is claimed is:

1. A method of preparing a stable, non-hygroscopic potassium monopersulfate composition, the method comprising:
    adding an $H_2O_2$ solution containing at least 70 wt. % $H_2O_2$ to a $H_2SO_4$ solution containing at least 90 wt. % $H_2SO_4$ at a substoichiometric ratio of $H_2SO_4:H_2O_2$ to generate a first Caro's acid solution, wherein the first Caro's acid solution contains $H_2SO_5$, and $H_2O$;
    combining the first Caro's acid solution and oleum that contains $H_2SO_4$ and $SO_3$, wherein the oleum reacts with the $H_2O$ in the first Caro's acid solution to produce a second Caro's acid solution;
    adding an alkali potassium compound to the second Caro's acid solution to achieve a partially neutralized solution containing a potassium monopersulfate composition of the formula $(KHSO_5)x.(KHSO_4)y.(K_2SO_4)z$, where $x+y+z=1$ and $x=0.46$–$0.64$, $y=0.15$–$0.37$, and $z=0.15$–$0.37$, said potassium monopersulfate composition having an active oxygen content greater than or equal to 4.9 wt. % and $K_2S_2O_8$ at a concentration of <0.5 wt. % of the potassium monopersulfate composition.

2. The method of claim 1 further comprising maintaining a temperature of the first Caro's solution at or below 20° C.

3. The method of claim 1, wherein the potassium monopersulfate composition has a K:S molar ratio >1.

4. The method of claim 1, wherein the alkali potassium compound is added in the form of a solution.

5. The method of claim 1, wherein the alkali potassium compound is selected from a group consisting of $K_2CO_3$, $KHCO_3$, and KOH.

6. The method of claim 1, wherein solution temperature during the adding of the alkali potassium compound to the second Caro's acid solution is maintained at or below 30° C.

7. The method of claim 1, wherein solution temperature during the adding of the alkali potassium compound to the second Caro's acid solution is maintained at or below 20° C.

8. The method of claim 1, wherein the second Caro's acid solution has an $SO_4:H_2O_2$ molar ratio of between 1:1 and 1.6:1.

9. The method of claim 1, wherein the potassium monopersulfate composition has a $K_2S_2O_8$ concentration of <0.1 wt. % of the composition.

10. The method of claim 1, wherein combining the first Caro's acid solution and the oleum comprises:
    adding the first Caro's acid solution to the oleum; and
    stopping the adding of the first Caro's acid solution when the molar ratio of $H_2SO_4:H_2O_2$ is at least one.

11. The method of claim 10, wherein no more than 70 wt. % of the oleum is $SO_3$.

12. The method of claim 10, wherein a temperature during the combining of the first Caro's acid solution and the oleum is maintained at or below 25° C.

13. The method of claim 10, wherein a temperature during the combining of the first Caro's acid solution and the oleum is maintained at or below 15° C.

14. The method of claim 10, wherein a molar ratio of $SO_4$ to $H_2O_2$ is at least 1 after the combining.

15. The method of claim 10 further comprising mixing the first Caro's acid solution for 0.1–2 hours before the combining.

16. The method of claim 10, wherein the combining of the first Caro's acid solution and the oleum comprises adding the first Caro's acid solution to an agitated solution containing the oleum while maintaining a solution temperature less than or equal to 15° C.

17. The method of claim 10 further comprising diluting the second Caro's acid solution to produce a diluted Caro's acid solution having a water content of 40 to 65 wt. %.

18. The method of claim 17, wherein the diluting of the second Caro's acid solution is done by combining the second Caro's acid solution with $H_2O$ at a temperature at or below 25° C.

19. The method of claim 17, wherein the diluting of the second Caro's acid solution is done by combining the second Caro's acid solution with $H_2O$ at a temperature at or below 15° C.

20. The method of claim 17 further comprising concentrating the partially neutralized solution by mixing the partially neutralized solution in a vacuum evaporator at a temperature less than or equal to 35° C.

21. The method of claim 20 further comprising drying the slurry at a temperature lower than 90° C. to produce the potassium monopersulfate composition.

22. The method of claim 20 further comprising drying the concentrated slurry at a temperature lower than 70° C. to produce the potassium monopersulfate composition.

23. The method of claim 20 further comprising:
    separating the slurry into solids and a mother liquor; and
    drying the solids to produce the potassium monopersulfate composition.

24. The method of claim 23, wherein the diluting of the second Caro's acid solution comprises combining the second Caro's acid solution with the mother liquor after the separating of the slurry.

25. The method of claim 23, wherein the diluting of the second Caro's acid solution occurs from combining the second Caro's acid solution with a working solution, which is a mixture of the second Caro's acid solution, a solution of the alkali potassium compound, the partially neutralized solution, and the mother liquor.

26. The method of claim 23, wherein the slurry contains at least 30 wt. % solids.

27. The method of claim 26, wherein a concentration of the solids in the slurry is determined by achieving a specific gravity >1.55.

28. The method of claim 27, wherein the concentration of the solids is determined by achieving a specific gravity >1.65 measured at 29° C.

29. The method of claim 23, wherein the mother liquor is recycled to the vacuum evaporator and mixed with the partially neutralized solution.

30. The method of claim 10 further comprising diluting the second Caro's acid solution with $H_2O$ to produce a solution which contains no more than 60 wt. % $H_2SO_5$ and having a $H_2SO_5:H_2SO_4$ molar ratio of at least about 2.0.

31. The method of claim 10, wherein the partially neutralized solution has a K:S molar ratio between about 1.05 and about 1.25.

* * * * *